United States Patent [19]

Bauer et al.

[11] 4,144,230

[45] Mar. 13, 1979

[54] SOLUBLE TRISAZO DYESTUFFS CONTAINING A 2-PHENYL-BENZIMIDAZOLYL, -BENZOXAZOLYL OR -BENZTHIAZOLYL MIDDLE COMPONENT

[75] Inventors: Wolfgang Bauer, Maintal; Joachim Ribka, Offenbach, both of Fed. Rep. of Germany

[73] Assignee: Cassella Aktiengesellschaft, Frankfurt, Fed. Rep. of Germany

[21] Appl. No.: 795,434

[22] Filed: May 10, 1977

[30] Foreign Application Priority Data

May 19, 1976 [DE] Fed. Rep. of Germany ....... 2622303

[51] Int. Cl.[2] .............................................. C09B 35/36

[52] U.S. Cl. .................................... 260/157; 260/158; 260/141

[58] Field of Search ................................ 260/157, 158

[56] References Cited

U.S. PATENT DOCUMENTS 4,033,945 7/1977 Bauer et al. .......................... 260/157

*Primary Examiner*—Charles F. Warren

*Attorney, Agent, or Firm*—Connolly and Hutz

[57] ABSTRACT

A water-soluble trisazo dyestuff of the formula $B_1$—N=N—Z—N=N—M—N=N—$B_2$ is useful for dyeing substances containing nitrogen or hydroxyl wherein Z is

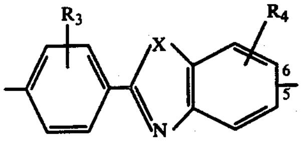

or

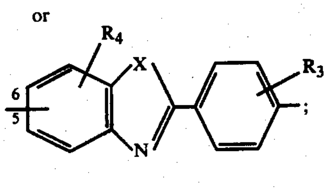

M has the formula

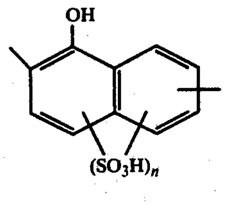

or

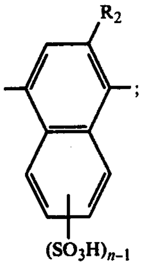

$B_1$ and $B_2$ are the same or different and are selected from the group consisting of

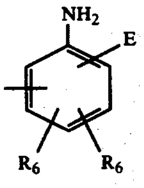

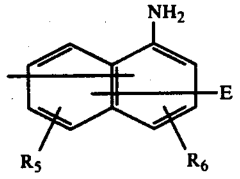

X is

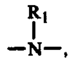

—O— or —s—; $R_1$ is hydrogen, alkyl having 1 to 4 carbon atoms, phenyl or benzyl; $R_2$ is hydrogen, alkyl or alkoxy having 1 to 4 carbon atoms; $R_3$ and $R_4$ are hydrogen, chloro, bromo, alkyl and alkoxy having 1 to 2 carbon atoms; E is a hydrogen atom, hydroxyl, amino, alkylamino having 1 to 4 carbon atoms, phenylamino, naphthylamino, benzoylamino, naphthoylamino, alkanoylamino having 2 to 5 carbon atoms, carboxyalkylamino having 2 to 3 carbon atoms, sulphoalkylamino having 1 to 2 carbon atoms, hydroxyalkylamino having 1 to 2 carbon atoms, dialkylamino having 1 to 4 carbon atoms in each alkyl, phenyl-alkylamino, naphthylalkylamino having 1 to 4 carbon atoms in the alkyl chains and alkanoyl-alkylamino having 1–4 carbon atoms in the alkyl and 2 to 5 carbon atoms in the alkanoyl group.

$R_5$ and $R_6$ are the same or different and are selected from the group consisting of hydrogen, alkyl having 1-4 carbon atoms, alkoxy having 1-4 carbon atoms, nitro, sulpho, chloro, bromo, alkoxy-carbonyl having 2-5 carbon atoms and carboxyl with the proviso that at least one of M, $B_1$ and $B_2$ includes a sulpho substituent.

9 Claims, No Drawings

SOLUBLE TRISAZO DYESTUFFS CONTAINING A 2-PHENYL-BENZIMIDAZOLYL, -BENZOXAZOLYL OR -BENZTHIAZOLYL MIDDLE COMPONENT

The present invention relates to a water-soluble trisazo dyestuff of the formula $B_1—N{=}N—Z—N{=}N—M—N{=}N—B_2$ wherein Z is

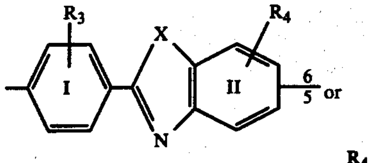

or

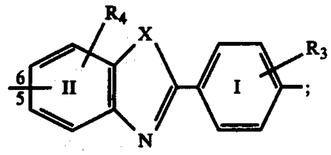

;

M has the formula

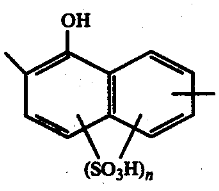

or

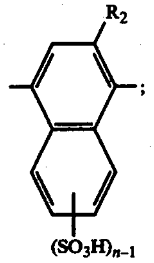

;

$B_1$ and $B_2$ are the same or different and are selected from the group consisting of

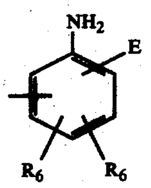

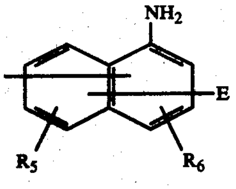

X is

,

—o— or —s—, $R_1$ is hydrogen, alkyl having 1 to 4 carbon atoms, phenyl or benzyl; $R_2$ is hydrogen, alkyl or alkoxy having 1 to 4 carbon atoms; $R_3$ and $R_4$ are hydrogen, chloro, bromo, alkyl and alkoxy having 1 to 2 carbon atoms;

E is a hydrogen atom, hydroxyl, amino, alkylamino having 1 to 4 carbon atoms, phenylamino, naphthylamino, benzoylamino, naphthoylamino, alkanoylamino having 2 to 5 carbon atoms, carboxyalkylamino having 2 to 3 carbon atoms, sulphoalkylamino having 1 to 2 carbon atoms, hydroxyalkylamino having 1 to 2 carbon atoms, dialkylamino having 1 to 4 carbon atoms in each alkyl, phenyl alkylamino, napththylalkylamino having 1 to 4 carbon atoms in the alkyl chains and alkanoyl-alkyl-amino having 1–4 carbon atoms in the alkyl and 2 to 5 carbon atoms in the alkanoyl group.

$R_5$ and $R_6$ are the same or different and are selected from the group consisting of hydrogen, alkyl having 1–4 carbon atoms, alkoxy having 1–4 carbon atoms, nitro, sulpho, chloro, bromo, alkoxy-carbonyl having 2–5 carbon atoms and carboxyl with the proviso that at least one of M, $B_1$ and $B_2$ includes a sulpho substituent.

The dyestuff of the present invention is useful for dyeing or printing natural or synthetic material which contains nitrogen or hydroxyl.

A preferred embodiment of the water soluble dyestuff of the present invention is M being

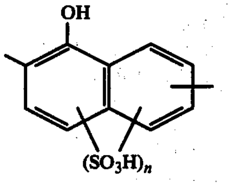

Another preferred embodiment of the water soluble dyestuff of the present invention is M being

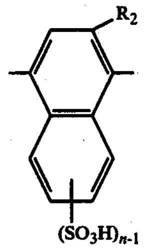

Another preferred embodiment of the water soluble dyestuff of the present invention is wherein $B_1$ and $B_2$ are aminophenyl or substituted amino phenyl of the formula

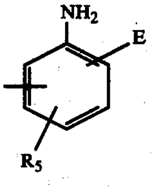

wherein

E is a hydrogen atoms, hydroxyl, amino, alkylamino having 1 to 4 carbon atoms, phenylamino, naphthylamino, benzoylamino, naphthoylamino, alkanoylamino having 2 to 5 carbon atoms, carboxylakylamino having 2 to 3 carbon atoms, sulphoalkylamino having 1 to 2 carbon atoms, hydroxyalkylamino having 1 to 2 carbon atoms, dialkylamino having 1 to 4 carbon atoms in each alkyl, $R_5$ is selected from the group consisting of hydrogen alkyl having 1–2 carbon atoms, alkoxy having 1–2 carbon atoms, nitro, sulpho, chloro and carboxyl.

Another preferred embodiment of the water soluble dyestuff of the present invention is wherein $B_1$ and $B_2$ are aminonaphthyl or substituted aminonaphthyl of the formula

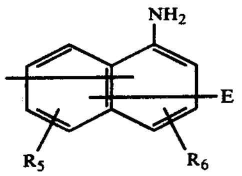

wherein

E is a hydrogen atom, hydroxyl.

One of $R_5$ and $R_6$ is hydrogen or sulfo and the other is selected from the group consisting of hydrogen, sulpho, chloro and carboxyl.

Another preferred embodiment of the water soluble dyestuff of the present invention is wherein the dyestuff contains 2–4 acid groups which may be sulpho groups or carboxyl groups.

The divalent radicals M are derived from coupling components of the formula $$M-NH_2$$

of the aromatic series which contain a diazotizable amino group and also can carry other substituents customary in dyestuff chemistry.

In particular, the radicals M are derived from diazotisable coupling components $M-NH_2$ (V) of the amino-8-hydroxy-naphthalene series of the formula Va or of the 1-amino-naphthalene series of the formula Vb

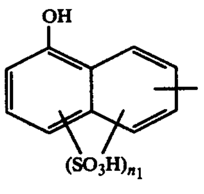

Va

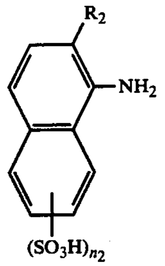

Vb

Preferred diazotizable coupling components of the formula Va from which the divalent radicals M are derived are coupling components, containing amino groups, of the 2-amino-8-hydroxynaphthalene, 3-amino-8-hydroxynaphthalene or 1-amino-8-hydroxynaphthalene series which are monosubstituted or disubstituted by sulpho groups.

Preferred diazotizable coupling compoenents of the formula Vb are derived from coupling components of the 1-aminonaphthalene series, which can be substituted by a sulpho group and/or an alkoxy group with 1 or 2 C atoms.

The radicals $B_1$ and $B_2$ which denote the radicals of diazotizable coupling components contained in the dyestuffs according to the invention can be identical or different and are derived from coupling components of the benzene or naphthalene series which contain one or two diazotizable amino groups. The radicals $B_1$ and/or $B_2$ of the benzene or naphthalene series represent a phenyl radical or an α- or β-naphthyl radical which is monosubstituted by a diazotizable amino group and can carry, as further substituents, a hydroxy group or an amino group which can be monosubstituted or disubstituted by alkyl with 1–4 C atoms, monosubstituted by aryl or aroyl with 6–12 C atoms, acyl with 2–5 C atoms, carboxyalkyl or sulphoalkyl or hydroxy-alkyl, in each case especially with 1 or 2 C atoms in the alkyl radical, or disubstituted by aryl with 6–12 C atoms or acyl with 2–5 C atoms and alkyl with 1–4 C atoms, and the phenyl or naphthyl radical can also be further monosubstituted or disubstituted by alkyl with 1–4 C atoms, alkoxy with 1–4 C atoms, carboxyl, sulpho, chlorine, bromine, nitro or alkoxycarbonyl with 1–4 C atoms in the alkoxy radical.

In a preferred group of dyestuffs according to the invention, $B_1$ and/or $B_2$ represent a phenyl radical which is monosubstituted by a diazotizable amino group and can contain, as further substituents, a hydroxyl group or an amino group which can carry a sulphomethyl, sulphoethyl, carboxymethyl, carboxyethyl, hydroxymethyl, hydroxyethyl, acetyl, benzoyl, phenyl, tolyl, methyl or ethyl substituent or two methyl or ethyl substituents, and the phenyl radical can also be further monosubstituted by alkyl with 1–2 C atoms, alkoxy with 1–2 C atoms, carboxyl, sulpho, chlorine or nitro.

A further preferred group of dyestuffs according to the invention contain, as $B_1$ and/or $B_2$, an α- or β-naphthyl radical which is monosubstituted by a diazotisable amino group and can contain, as a further substituent, a hydroxyl group, and the naphthyl radical can also be further monosubstituted by sulpho, carboxyl or chlorine or disubstituted by $-SO_3H$.

The divalent radical of 2-phenylbenzimidazole, 2-phenylbenzoxazole or 2-phenylbenzthiazole contained in the dyestuffs according to the invention as the middle component can be linked via the azo bridge to the coupling component $B_1$ either with the unfused 2-phenyl nucleus (nucleus I) or with the fused phenyl (nucleus II).

Accordingly, in the sense of the present invention mixtures of dyestuffs which, with respect to the incorporation of the heterocyclic middle component, are isomeric with one another are also to be regarded as dyestuffs according to the invention.

The azo bridge linked to nucleus II of the benzimidazole, benzoxazole or benzthiazole system can be in the 5- or 6-position, which the bond between the 5-position and 6-position in the general formula is intended to indicate.

The nuclei I and II of the heterocyclic middle component can be substituted by one or two identical or different substituents of the group alkyl and/or alkoxy with 1 to 2 C atoms in each case and/or halogen. Dyestuffs according to the invention in which the nuclei I and/or II are substituted by a methyl group or chlorine are preferred. Dyestuffs according to the invention in which the heterocyclic middle component is a divalent radical of 2-phenylbenzimidazole are particularly preferred.

The dyestuffs according to the invention are present, in particular, in the form of their sodium salts. Thos dyestuffs which contain 2–4 acid groups are particularly valuable. Acid groups in this sense are the carboxyl group which is capable of salt formation and the sulphonic acid group.

The dyestuffs according to the invention of the general formula I $$B_1-N=N-Z-N=N-M-N=N-B_2 \qquad I$$

wherein Z denotes the radical

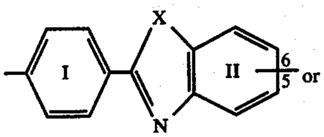

or

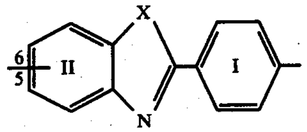

and $B_1$, $B_2$, X and M have the meanings given above, can be manufactured by a process in which a heterocyclic diamine of the formula XI

XI

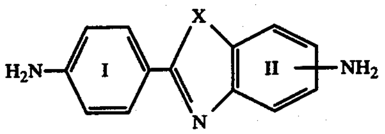

is tetrazotised and the tetrazotisation product is initially coupled on one side with a diazotisable coupling component of the formula V $$M—NH_2 \qquad V$$

to give the diazotised monoazo dyestuff of the formula XIV $$y^{\ominus}[N^{\oplus}{=}N—Z—N{=}N—M—NH_2 \qquad XIV$$

wherein $y^{\ominus}$ represents an anion, preferably the anion of a mineral acid, for example hydrochloric acid or sulphuric acid, and Z and $M—NH_2$ have the meaning already indicated.

The diazotisable amino group in the radical $M—NH_2$ of the diazotised monoazo dyestuff XIV is subsequently further diazotised and the tetrazotised monoazo dyestuff formed of the general formula XV $$[N^{\oplus}{=}N—Z—N{=}N—M—N{=}N^{\oplus}]2y^{\ominus} \qquad XV$$

is coupled with one mol of each of the diazotisable coupling components $B_1$—H (XII) and $B_2$—H (X) wherein $B_1$ and $B_2$ are the same or different and have the meanings given above, to give the trisazo dyestuffs according to the invention of the formula I.

The tetrazotisation of the heterocyclic diamine XI is carried out in the manner which is in itself known, for example by the action of nitrous acid in an acid aqueous medium at temperatures from −10° to +30° C. The subsequent coupling, on one side, with the diazotisable coupling component $M—NH_2$ (V) to give the diazotised monoazo dyestuff XIV is carried out in an aqueous medium at temperatures from −10° to +30° C. and pH values from 3 to 12, preferably 4 to 9.

The further diazotisation of the diazotised monoazo dyestuff XIV to give the tetrazotised monoazo dyestuff XV is also carried out in an aqueous medium at 0–3° C., and the coupling of XV with the diazotable coupling components $B_1$—H (XII) and $B_2$—H (X) to give the end dyestuff I is carried out at pH values between 4 and 12, preferably 7 and 10.

Solvents which are miscible with water, for example alcohols, can be optionally present in the aqueous medium. Coupling accelerators which are in themselves known, for example pyridine, urea or thiourea, can be present during the coupling reactions.

According to this process, if two different coupling components $B_1H$ and $B_2H$ are employed, mixtures of dyestuffs according to the invention, which differ with respect to the radicals represented by $B_1$ and $B_2$, are obtained. For example, if two specific coupling components $B_1H$ and $B_2H$ are simultaneously reacted with a tetrazo compound XV, mixtures of dyestuffs according to the invention of the general formulae $$B_1—N{=}N—Z—N{=}N—M—N{=}N—B_1$$

$$B_2—N{=}N—Z—N{=}N{=}N—M—N{=}N—B_2$$

$$B_1—N{=}N—Z—N{=}N—M—N{=}N—B_2$$

and $$B_1—N{=}N—Z—N{=}N—M—N{=}N—B_1$$

can be obtained. Mixtures of this type of dyestuffs according to the invention also belong to the subject of the invention and have a high technological value.

Valuable mixtures of the dyestuffs of the present invention are also obtained if mixtures of several, preferably two different coupling components coming within the above stated definition are used for $B_1$—H and/or $B_2$—H.

Heterocyclic diamines of the formula XI

XI $H_2M—Z—NH_2$ = 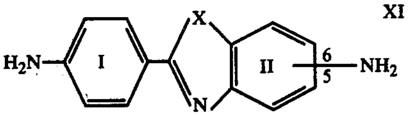

which are suitable for the manufacture of the trisazo dyestuffs according to the invention of the general formula I are, for example: 2-(4′-aminophenyl)-5- (or 6)-aminobenzimidazole, 1-methyl-2-(4′-aminophenyl)-6-amino-benzimidazole, 1-methyl-2-(4′-aminophenyl)-5-amino-benzimidazole, 1-ethyl-2-(4′-aminophenyl)-5-amino-benzimidazole, 1-propyl-2-(4′-aminophenyl)-5-amino-benzimidazole, 1-butyl-2-(4′-aminophenyl)-5-amino-benzimidazole, 1-phenyl-2-(4′-aminophenyl)-5-amino-benzimidazole, 1-benzyl-2-(4′-aminophenyl)-5-aminobenzimidazole, 2-(4′-aminophenyl)-4-methyl-5-amino-benzimidazole (identical to 2-(4′-aminophenyl)-6-amino-7-methylbenzimidazole), 2-(4′-aminophenyl)-5-amino-6-methyl-benzimidazole (identical to 2-(4′-aminophenyl)-5-methyl-6-aminobenzimidazole), 2-(4′-aminophenyl)-5-amino-6-chloro-benzimidazole (identical to 2-(4′-aminophenyl)-5-chloro-6-aminobenzimidazole), 2-(4′-aminophenyl)-5-amino-7-chloro-benzimidazole (identical to 2-(4′-aminophenyl)-4-chloro-6-aminobenzimidazole), 2-(4′-aminophenyl)-5-amino-6-ethoxy-benzimidazole (identical to 2-(4′-aminophenyl)-5-ethoxy-6-aminobenzimidazole), 2-(2′-methyl-4′-aminophenyl)-5- (or 6)-amino-benzimidazole, 2-(3′-methyl-4′-aminophenyl)-5- (or 6)-amino-benzimidazole, 1-(2′-chloro-4′-aminophenyl)-5- (or 6)-amino-benzimidazole, 2-(3′-chloro-4′-aminophenyl)-5- (or 6)-amino-benzimidazole, 2-(4′-aminophenyl)-5-amino-benzoxazole, 2-(4′-aminophenyl)-6-amino-benzoxazole, 2-(4′-amino-2′-chloro-phenyl)-5-amino-benzoxazole, 2-(4′-aminophenyl)-4-methyl-5-amino-benzoxazole, 2-(4′-aminophenyl)-5-aminobenzthiazole, 2-(4′-aminophenyl)-6-amino-benzthiazole, 2-(4'-aminophenyl)-6-methyl-5-amino-benzthiazole, 2-(4'-aminophenyl)-5-methyl-6-amino-benzthiazole and 2-(4'-aminophenyl)-5-chloro-6-amino-benzthiazole.

Tautomerism is possible in the benzimidazoles where X——BH—, so that, for example, no distinction can be made between the 5-position and 6-position. If further substituents are also present in the nucleus II, there are two different possibilities of numbering, which has been taken into account above.

Furthermore, all thos heterocyclic diamines which can be obtained according to the manufacturing methods indicated in U.S. Pat. No. 4,033,945, column 4, line 35 through column 7, line 25, are suitable for the manufacture of trisazo dyestuffs according to the invention.

The heterocyclic diamines XI have an unsymmetrical structure. Two possible products can be formed when a tetrazotised heterocyclic diamine XI is coupled with a diazotisable coupline component M—$NH_2$ (V), depending on which side ofthe tetrazotised heterocyclic diamine is first coupled. The following two structures are given, corresponding to these possibilities, for the end dyestuffs:

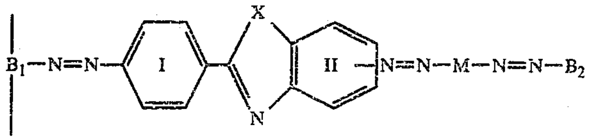

Ia

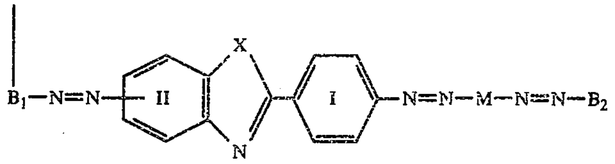

Ib

It can be assumed that the triasazo dyestuffs (I) which can be manufactured in the said manner are mixtures of the two components (Ia) and (Ib). Suitable diazotisable coupling components of the formula M—$NH_2$ (V) are, for example: 2-amino-8-hydroxynaphthalene-6-sulphonic acid, 3-amino-8-hydroxynaphthalene-6-sulphonic acid, 2-amino-8-hydroxynaphthalene-3,6-disulphonic acid, 1-amino-8-hydroxynaphthalene-3,6-disulphonic acid, 1-amino-8-hydroxynaphthalene-4,6-disulphonic acid, 1-amino-8-hydroxynaphthalene-4-sulphonic acid, 1-aminonaphthalene-6-sulphonic acid, 1-aminonaphthalene-7-sulphonic acid, 1-amino-2-ethoxynaphthalene-6-sulphonic acid, 1-aminonaphthalene, 1-amino-2-methoxynaphthalene and 1-amino-2-ethoxynaphthalene.

Suitable coupling components of the formula $B_1$—H (XII) and/or $B_2$—H (X) for the manufacture of the dyestuffs according to the invention are, for example: 1-amino-3-hydroxybenzene, 1-amino-3-hydroxy-4-chlorobenzene, 3-aminophenol-4-sulphonic acid, 3-aminophenol-6-sulphonic acid, 1,3-diaminobenzene, 1,3-diamino-4-methylbenzene, 1,3-diamino-4-ethylbenzene, 1,3-diamino-4-n-propylbenzene, 1,3-diamino-4-n-butylbenzene, 1,3-diamino-4-chlorobenzene, 1,3-diamino-4-bromobenzene, 1,3-diamino-4-methoxybenzene, 1,3-diamino-4-ethoxybenzene, 1,3-diamino-4-nitrobenzene, 1-amino-3-dimethylaminobenzene, 1,3-diamino-4-n-propoxybenzene, 1,3-diamino-4-iso-propoxybenzene, 1-amino-3-diethylaminobenzene, 3-methylaniline, 2,5-dimethylaniline, 2,5-dimethoxyaniline, 2-methoxy-5-methylaniline, 2-ethoxy-5-methylaniline, 3-methoxyaniline, 3-aminoformanilide, 1-amino-3-acetylaminobenzene, 1-amino-3-acetylamino-6-methylbenzene, 1-amino-3-acetylamino-6-ethylbenzene, 1-amino-3-benzoylamino-benzene, 1-amino-3-propionylamino-benzene, 1-amino-3-butyrylaminobenzene, 1-amino-3-oxalylaminobenzene, 1-amino-3-oxalylamino-6-methylbenzene, 1-amino-3-acetylamino-6-methoxybenzene, 1-amino-3-acetylamino-6-ethoxybenzene, 1-amino-3-carboxymethylaminobenzene, 1-amino-3-carboxyethylaminobenzene, 1-amino-3-hydroxyethylaminobenzene, 1-amino-3-sulphomethylaminobenzene, 1-amino-3-sulphoethylaminobenzene, 1,3-diaminobenzene-4-sulphonic acid, 2,4-diaminotoluene-5-sulphonic acid, 2,4-diaminotoluene-6-sulphonic acid, 2,6-diaminotoluene-4-sulphonic acid, 1,3-diaminobenzene-4,6-disulphonic acid, 1-amino-3-acetylaminobenzene-6-sulphonic acid, 2-acetylamino-4-aminotoluene-5-sulphonic acid, 2-amino-4-acetylaminotoluene-6-sulphonic acid, 1-aminonaphthalene, 1-aminonaphthalene-4-, -5-, -6- and -7-sulphonic acid, 1-aminonaphthalene-3,6-disulphonic acid, 1-aminonaphthalene-5,7-disulphonic acid, 1-aminonaphthalene-3,7-disulphonic acid, 2-aminonaphthalene-5-sulphonic acid, 2-aminonaphthalene-6-sulphonic acid, 2-aminonaphthalene-7-sulphonic acid, 2-aminonaphthalene-8-sulphonic acid, 2-aminonaphthalene-3,6-disulphonic acid, 2-aminonaphthalene-4,8-disulphonic acid, 2-aminonaphthalene-6,8-disulphonic acid, 2-aminonaphthalene-5,7-disulphonic acid, 1-amino-7-hydroxynaphthalene, 2-amino-7-hydroxynaphthalene, 1-amino-5-hydroxynaphthalene-7-sulphonic acid, 1-amino-7-hydroxynaphthalene-5-sulphonic acid, 1-amino-8-hydroxynaphthalene-4-sulphonic acid, 1-amino-8-hydroxynaphthalene-2,4-disulphonic acid, 1-amino-8-hydroxynaphthalene-3,6-disulphonic acid, 1-amino-8-hydrosynaphthalene-4,6-disulphonic acid, 2-amino-5-hydroxynaphthalene-7-sulphonic acid, 2-amino-8-hydroxynaphthalene-6-sulphonic acidand 2-amino-8-hydroxynaphthalene-3,6-disulphonic acid.

The trisazo dyestuffs according to the inventions have a good tinctorial strength. They are outstandingly suitable for use as direct dyestuffs for dyeing and printing natural or synthetic fibre materials containing hydroxyl groups or nitrogen, especially cotton and regenerated cellulose as well as wool, wool/cotton union, silk, polyamide, leather and paper. Dyeing and printing are carried out by the customary processes. Brown to red, blue and black dyeings with good fastness properties are obtained on the substrates mentioned.

In particular, the new dyestuffs are distinguished by good fastness to wet processing, for example fastness to water, washing at 40° C. and washing at 60° C., by good fastness to perspiration (alkaline and acid) and fastness to acid, as well as by good levelling power and good solubility, and in this respect are substantially superior to the most closely comparable known dyestuffs.

If X is

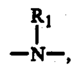

in particular

the new dyestuffs are absorbed to a particularly great extent onto the fibre materials to be dyed during dyeing by the exhaustion process so that an almost clear residual liquor is obtained.

The new dyestuffs are particularly suitable for dyeing fibres of cotton and regenerated cellulose as well as for dyeing polyamide.

In the examples which follow, parts denote parts by weight, percentages denote percentages by weight and the temperatures are indicated in degrees centigrade.

EXAMPLE 1

22.4 parts of 2-(4'-aminophenyl)-5 (or 6)-aminobenzimidazole are tetrazotised in a mixture consisting of 200 parts of water and 50 parts of 30% strength aqueous hydrochloric acid with a solution of 13.8 parts of sodium nitrite in 50 parts of water at 0°-5° C., with the addition of ice. After adding the sodium nitrite solution, the mixture is subsequently stirred for about 1 hour at 0°-5° C. and excess nitrous acid is then removed by means of sulphamic acid. Thereafter, a neutral solution of 22.3 parts of 1-aminonaphthalene-6 (and 7)-sulphonic acid (industrial mixture) in 200 parts of water is run into the yellow solution of the tetrazo compound at 0°-5° C. The pH value of the mixture is subsequently adjusted to 2.5 with 4 parts of sodium acetate, the mixture is stirred for about 10 hours at 0°-5° C. and the one-sided coupling reaction is completed by increasing the pH value to 4.5 with 8 parts of sodium acetate.

30 parts of 30% strength aqueous hydrochloric acid are subsequently added to the mixture of the diazotised monoazo dyestuff and a solution of 6.9 parts of sodium nitrite in 30 parts of water is then added at 0°-5° C. To completethe further diazotisation, the mixture is subsequently stirred for about 3 hours at 0°-5° C. and excess nitrous acid is removed with sulphamic acid. The suspension of the tetrazotised monoazo dyestuff thus obtained is subsequently allowed to run into a solution of 47.8 parts of 3-amino-8-hydroxynaphthalene-6-sulphonic acid, 8 parts of sodium hydroxide and 74 parts of sodium carbonate in 300 parts of water at 0°-5° C.

The mixture is subsequently stirred for 2 hours at pH 8-9 and 10°-15° C., the pH value is adjusted to 7.5 with 30% strength hydrochloric acid, the product is filtered off and the dyestuff having the structure

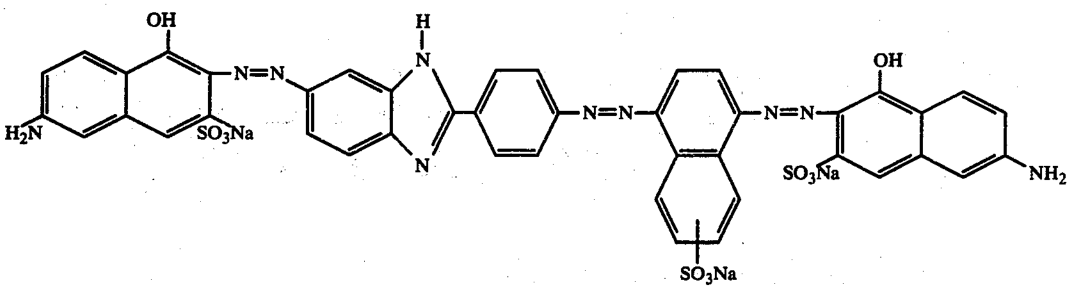

is dried at 70°-80° C.

A solution of 0.2 part of sodium carbonate and 4 parts of sodium sulphate decahydrate in 200 parts of water is prepared at 40° C. in a dyeing beaker which is in a bath which can be heated.

0.2 part of the dyestuff prepared is then added. 10 g of cotton fabric is kept continuously in motion in the dye liquor, the temperature is increased to 95° C. and dyeing is further carried out for 45 minutes at this temperature. The dyed cotton fabric is thereafter removed from the residual liquor, which remains only weakly coloured, and the liquor still attached is removed by wringing out. The dyed material is subsequently rinsed with cold water and dried at 60° C.

A blue-violet, level dyeing of good depth of colour and with good fastness properties, in particular with good fastness to washing, water and perspiration, is obtained.

EXAMPLE 2

22.4 parts of 2-(4'-aminophenyl)-5 (or 6)-aminobenzimidazole are tetrazotised according to the instructions in Example 1. The pH of the tetrazo solution is subsequently buffered to 3 with about 8 parts of sodium acetate.

A solution of 21.9 parts of 2-amino-8-hydroxynaphthalene-6-sulphonic acid, 3.6 parts of sodium hydroxide and 17 parts of sodium carbonate in 150 parts of water is then added to the buffered solution of the tetrazo component in the course of about 10 minutes and the mixture is subsequently stirred for about 30 minutes at a pH of 6.5-7.5. The mixture of the diazotised monozao dyestuff is subsequently adjusted to pH 1-1.5 with 40 parts of 30% strength aqueous hydrochloric acid and a solution of 6.9 parts of sodium nitrite in 30 parts of water is added at 0°-5° C. The mixture is further stirred for about 3 hours at 0°-5° C. and excess nitrous acid is then removed by means of sulphamic acid.

The suspension of the tetrazotisedmonoazo dyestuff is subsequently run into a solution of 1-amino-3-carboxymethylaminobenzene at 0°-5° C., which has been previously prepared as follows: 21.6 parts of 1,3-diaminobenzene are introduced into 100 parts of water and a solution of 19.3 parts of monochloroacetic acid and 8 parts of sodium hydroxide in 100 parts of water is added. This mixture is subsequently heated to 90° C. for 2 hours. The mixture is cooled to 0°-5° C. and 21.6 parts of sodium carbonate are added.

After adding the suspension of the tetrazotised monoazo dyestuff to this condensation solution, the mixture is subsequently stirred for 2 hours at pH 8-9 and the pH value is adjusted to 7.5 with 30% strength aqueous hydrochloric acid. The trisazo dyestuff having the structure

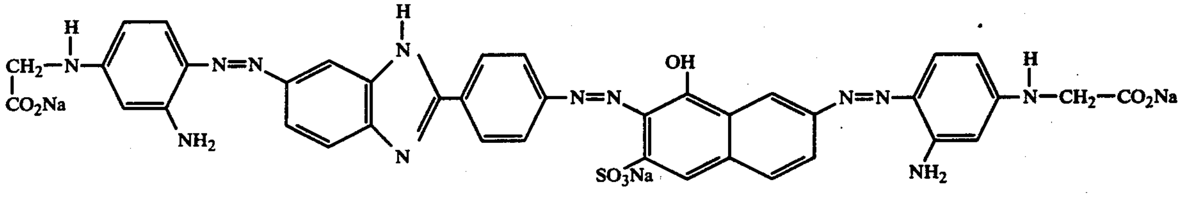

is filtered off and dried at 70°-80° C.

The dyestuff dyes cotton and regenerated cellulose in dark brown level colour shades. The dyeings have a good depth of colour and good fastness properties, in particular good fastness to washing, water and perspiration.

EXAMPLE 3

The tetrazotisation of 22.4 parts of 2-(4'-aminophenyl)-6-aminobenzimidazole, one-sided coupling of the resulting tetrazo compound with 21.5 parts of 2-amino-8-hydroxynaphthalene-6-sulphonic acid and further diazotisation of the diazotised monoazo dyestuff to give the tetrazotised monoazo dyestuff of the formula

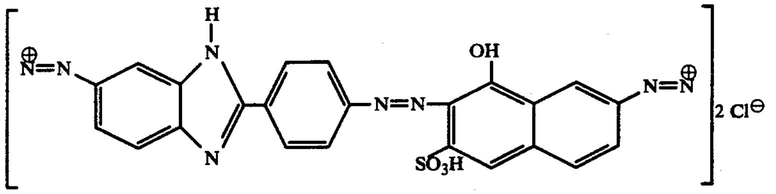

is carried out according to the instructions in Example 2.

A solution of 23.9 parts of 2-amino-8-hydroxynaphthalene-6-sulphonic acid, 4 parts of sodium hydroxide and 31.8 parts of sodium carbonate in 200 parts of water is allowed to run rapidly into the acid suspension of the tetrazotised monoazo dyestuff and the mixture is subsequently stirred for 30 minutes at pH 8-9 and 0°-5° C. to complete the one-sided coupling reaction. A solution of 10.8 parts of 1,3-diaminobenzene in 100 parts of water is then rapidly added and the mixture is further stirred for 2 hours at pH 8-9. The pH value of the mixture is adjusted to 7.5 with 30% strength aqueous hydrochloric acid; the trisazo dyestuff is then filtered off and dried at 70°-80° C. The dyestuff dyes cotton and regenerated cellulose in violet-black colour shades. The dyeings are distinguished by a good depth of colour and good fastness properties, in particular by good fastness to washing, water and perspiration.

The structural composition of further dyestuffs which can be manufactured according to Examples 1, 2 and 3 can be seen from the Table.

The fllowing is indicated in the Table:

In column 1: the coupling component $B_1$—H (XII) used

In column 2: the diazotisable coupling component M — $NH_2$ of the formulae Va or Vb used

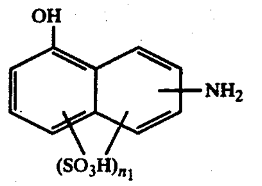

Va

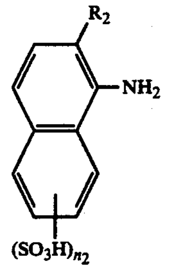

Vb

In column 3: the heterocyclic diamine used, the heterocyclic diamines of the formula

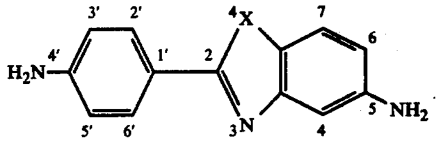

that is to say the 5-isomers, being listed in Table I and the heterocyclic diamines of the formula

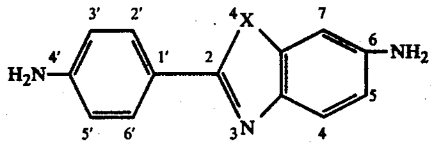

that is to say the 6-isomers, being listed in Table II. In the first position in column 3, the meaning of —X— is indicated. In addition, other substituents which may be present and their position in the molecule are listed in column 3, the numbering being indicated above. The data "—NH—, 4—$CH_3$" in column 3 of Table I thus denotes, for example, the compound

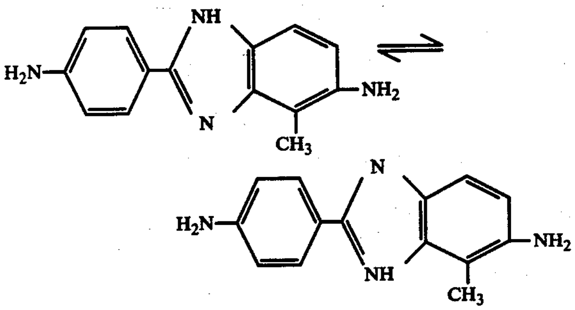

Because of the possibility of tautomerism, this compound can be designated 4-methyl-2-(4'-aminophenyl)-5-amino-benzimidazole or 7-methyl-2-(4'-aminophenyl)-6-aminobenzimidazole.

In column 4: the coupling component $B_2H$ (X) used

In column 5: the colour shade of the dyestuff on cotton.

| Coupling component $B_1$—H | Diazotisable coupling component M—$NH_2$ | 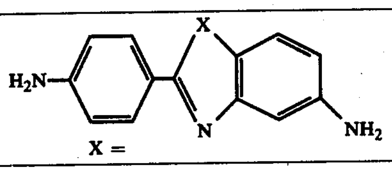 X = | Coupling component $B_2$—H | Colour shade on cotton |
|---|---|---|---|---|
| 3-Aminophenol-6-sulphonic acid | 2-amino-8-hydroxy-naphthalene-6-sulphonic acid | —NH— | 3-aminophenol-6-sulphonic acid | brown |
| 3-aminophenol-4-sulphonic acid | " | —NH— | 3-aminophenol-4-sulphonic acid | " |
| 1-amino-3-sulphomethyl-aminobenzene | " | —NH— | 1-amino-3-sulphomethyl-aminobenzene | " |
| 2-amino-4-carboxymethyl-aminotoluene | " | —NH— | 2-amino-4-carboxymethyl-aminotoluene | " |
| 2-amino-4-sulphomethyl-aminotoluene | " | —NH— | 2-amino-4-sulphomethyl-aminotoluene | " |
| 1-aminonaphthalene-6-sulphonic acid | " | —NH— | 1-aminonaphthalene-6-sulphonic acid | brown-violet |
| 1,3-diaminobenzene-4-sulphonic acid | " | —NH— | 1,3-diaminobenzene-4-sulphonic acid | brown |
| 2,4-diaminotoluene-6-sulphonic acid | " | —NH— | 2,4-diaminotoluene-6-sulphonic acid | brown |
| 2,4-diaminotoluene-5-sulphonic acid | " | —NH— | 2,4-diaminotoluene-5-sulphonic acid | " |
| 2,6-diaminotoluene-4-sulphonic acid | " | —NH— | 2,6-diaminotoluene-4-sulphonic acid | " |
| 1-amino-8-hydroxy-naphthalene-3,6-disulphonic acid | " | —NH— | 1-amino-8-hydroxy-naphthalene-3,6-disulphonic acid | blue |
| 2-amino-5-hydroxy-naphthalene-7-sulphonic acid | " | —NH— | 2-amino-5-hydroxy-naphthalene-7-sulphonic acid | blue-violet |
| 2-amino-8-hydroxy-naphthalene-6-sulphonic acid | " | —NH— | 2-amino-8-hydroxy-naphthalene-6-sulphonic acid | blue-black |
| 3-aminophenol | 1-aminonaphthalene-6-sulphonic acid | —NH— | 3-aminophenol | brown |
| 3-methoxyaniline | " | —NH— | 3-methoxyaniline | " |
| 3-methylaniline | " | —NH— | 3-methylaniline | " |
| 2,5-dimethylaniline | " | —NH— | 2,5-dimethylaniline | " |
| 2-methoxy-5-methyl-aniline | " | —NH— | 2-methoxy-5-methyl-aniline | " |
| 2,5-dimethoxyaniline | " | —NH— | 2,5-dimethoxyaniline | " |
| 3-aminophenol-4-sulphonic acid | " | —NH— | 3-aminophenol-4-sulphonic acid | " |
| 3-aminophenol-6-sulphonic acid | " | —NH— | 3-aminophenol-6-sulphonic acid | " |
| 1-amino-3-hydroxy -4-chlorobenzene | " | —NH— | 1-amino-3-hydroxy-4-chlorobenzene | " |
| 1,3-diaminobenzene-4-sulphonic acid | " | —NH— | 1,3-diaminobenzene-4-sulphonic acid | " |
| 2,4-diaminotoluene-6-sulphonic acid | " | —NH— | 2,4-diaminotoluene-6-sulphonic acid | " |
| 2,4-diaminotoluene-5-sulphonic acid | " | —NH— | 2,4-diaminotoluene-5-sulphonic acid | " |
| 2,6-diaminotoluene-4-sulphonic acid | " | —NH— | 2,6-diaminotoluene-4-sulphonic acid | " |
| 1-amino-3-acetylamino-benzene-6-sulphonic acid | " | —NH— | 1-amino-3-acetylamino-benzene-6-sulphonic acid | " |
| 2-amino-4-acetylamino-toluene-6-sulphonic acid | " | —NH— | 2-amino-4-acetylamino-toluene-6-sulphonic acid | " |
| 2-amino-4-formylamino-toluene-5-sulphonic acid | " | —NH— | 2-amino-4-formylamino-toluene-5-sulphonic acid | " |
| 1,3-diaminobenzene-4,6-disulphonic acid | " | —NH— | 1,3-diaminobenzene-4,6-disulphonic acid | " |
| 4-chloro-3,5-diamino-benzene-sulphonic acid | " | —NH— | 4-chloro-3,5-diamino-benzene-sulphonic acid | " |

-continued

| Coupling component $B_1$—H | Diazotisable coupling component M—$NH_2$ | 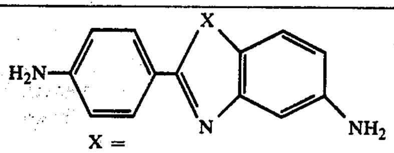 X = | Coupling component $B_2$—H | Colour shade on cotton |
|---|---|---|---|---|
| 1-amino-3-carboxymethyl-aminobenzene | " | —NH— | 1-amino-3-carboxymethyl-aminobenzene | " |
| 1-amino-3-carboxyethyl-aminobenzene | " | —NH— | 1-amino-3-carboxyethyl-aminobenzene | " |
| 1-amino-3-sulphomethyl-aminobenzene | " | —NH— | 1-amino-3-sulphomethyl-aminobenzene | " |
| 1-amino-3-sulphoethyl-aminobenzene | " | —NH— | 1-amino-3-sulphoethyl-aminobenzene | " |
| 1-amino-3-hydroxyethyl-aminobenzene | " | —NH— | 1-amino-3-hydroxyethyl-aminobenzene | " |
| 2-amino-4-carboxy-methylaminotoluene | " | —NH— | 2-amino-4-carboxy-methylaminotoluene | " |
| 2-amino-4-sulphomethyl-aminotoluene | " | —NH— | 2-amino-4-sulphomethyl-aminobenzene | " |
| 2-amino-4-hydroxyethyl-aminotoluene | " | —NH— | 2-amino-4-hydroxyethyl-aminobenzene | " |
| 1-carboxymethylamino-3-amino-4-chloro-benzene | " | —NH— | 1-carboxymethylamino-3-amino-4-chloro-benzene | " |
| 1-sulphomethylamino-3-amino-4-methoxybenzene | " | —NH— | 1-sulphomethylamino-3-amino-4-methoxybenzene | " |
| 1-carboxymethylamino-3-aminobenzene-4-sulphonic acid | " | —NH— | 1-carboxymethylamino-3-aminobenzene-4-sulphonic acid | " |
| 1-hydroxyethylamino-3-aminobenzene-4-sulphonic acid | " | —NH— | 1-hydroxyethylamino-3-aminobenzene-4-sulphonic acid | " |
| 1-amino-3-oxalylamino-benzene | " | —NH— | 1-amino-3-oxalylamino-benzene | " |
| 2-amino-4-oxalylamino-toluene | " | —NH— | 2-amino-4-oxalylamino-toluene | " |
| 1-aminonaphthalene-4-sulphonic acid | " | —NH— | 1-aminonaphthalene-4-sulphonic acid | brown-violet |
| 1-aminonaphthalene-6-sulphonic acid | " | —NH— | 1-aminonaphthalene-6-sulphonic acid | brown |
| 1-aminonaphthalene-7-sulphonic acid | " | —NH— | 1-aminonaphthalene-7-sulphonic acid | " |
| 1-amino-8-hydroxy-naphthalene-4-sulphonic acid | " | —NH— | 1-amino-8-hydroxy-naphthalene-4-sulphonic acid | blue |
| 1-amino-8-hydroxy-naphthalene-2,4-disulphonic acid | " | —NH— | 1-amino-8-hydroxy-naphthalene-2,4-disulphonic acid | blue |
| 1-amino-8-hydroxy-naphthalene-3,6-disulphonic acid | " | —NH— | 1-amino-8-hydroxy-naphthalene-3,6-disulphonic acid | reddish-tinged blue |
| 1-amino-8-hydroxy-naphthalene-4,6-disulphonic acid | " | —NH— | 1-amino-8-hydroxy-naphthalene-4,6-disulphonic acid | blue |
| 2-amino-8-hydroxy-naphthalene-6-sulphonic acid | " | —NH— | 2-amino-8-hydroxy-naphthalene-6-sulphonic acid | reddish-tinged blue |
| 2-amino-8-hydroxy-naphthalene-3,6-disulphonic acid | " | —NH— | 2-amino-8-hydroxy-naphthalene-3,6-disulphonic acid | reddish-tinged blue |
| 3-aminophenol | 1-aminonaphthalene-7-sulphonic acid | —NH— | 3-aminophenol | brown |
| 3-methoxyaniline | " | —NH— | 3-methoxyaniline | " |
| 3-methylaniline | " | —NH— | 3-methylaniline | " |
| 3-aminophenol-4-sulphonic acid | " | —NH— | 3-aminophenol-4-sulphonic acid | " |
| 3-aminophenol-6-sulphonic acid | " | —NH— | 3-aminophenol-6-sulphonic acid | " |
| 1,3-diaminobenzene | " | —NH— | 1,3-diaminobenzene | " |
| 1,3-diamino-4-methyl-benzene | " | —NH— | 1,3-diamino-4-methyl-benzene | " |
| 1,3-diaminobenzene-4-sulphonic acid | " | —NH— | 1,3-diaminobenzene-4-sulphonic acid | " |
| 2,4-diaminotoluene-6-sulphonic acid | " | —NH— | 2,4-diaminotoluene-6-sulphonic acid | " |
| 2,4-diaminotoluene-5-sulphonic acid | " | —NH— | 2,4-diaminotoluene-5-sulphonic acid | " |
| 2,6-diaminotoluene-4-sulphonic acid | " | —NH— | 2,6-diaminotoluene-4-sulphonic acid | " |
| 2-amino-4-acetylamino-toluene-6-sulphonic acid | " | —NH— | 2-amino-4-acetylamino-toluene-6-sulphonic acid | " |
| 1,3-diaminobenzene-4,6-disulphonic acid | " | —NH— | 1,3-diaminobenzene-4,6-disulphonic acid | " |
| 1-amino-3-carboxymethyl-aminobenzene | " | —NH— | 1-amino-3-carboxymethyl-aminobenzene | " |
| 1-amino-3-sulphomethyl-aminobenzene | " | —NH— | 1-amino-3-sulphomethyl-aminobenzene | " |
| 1-amino-3-hydroxyethyl-aminobenzene | " | —NH— | 1-amino-3-hydroxyethyl-aminobenzene | " |

-continued

| Coupling component $B_1$—H | Diazotisable coupling component M—$NH_2$ | 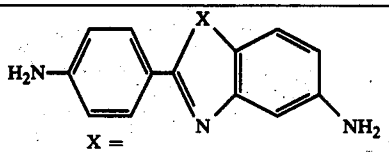 X = | Coupling component $B_2$—H | Colour shade on cotton |
|---|---|---|---|---|
| 2-amino-4-carboxymethyl-aminotoluene | " | —NH— | 2-amino-4-carboxymethyl-aminotoluene | " |
| 2-amino-4-sulphomethyl-aminotoluene | " | —NH— | 2-amino-4-sulphomethyl-aminotoluene | " |
| 2-amino-4-hydroxyethyl-aminotoluene | " | —NH— | 2-amino-4-hydroxyethyl-aminotoluene | " |
| 1-aminonaphthalene-6-sulphonic acid | " | —NH— | 1-aminonaphthalene-6-sulphonic acid | " |
| 1-aminonaphthalene-7-sulphonic acid | " | —NH— | 1-aminonaphthalene-7-sulphonic acid | " |
| 1-amino-8-hydroxy-naphthalene-4-sulphonic acid | " | —NH— | 1-amino-8-hydroxy-naphthalene-4-sulphonic acid | blue |
| 1-amino-8-hydroxy-naphthalene-2,4-disulphonic acid | " | —NH— | 1-amino-8-hydroxy-naphthalene-2,4-disulphonic acid | blue |
| 1-amino-8-hydroxy-naphthalene-3,6-disulphonic acid | " | —NH— | 1-amino-8-hydroxy-naphthalene-3,6-disulphonic acid | reddish-tinged blue |
| 1-amino-8-hydroxy-naphthalene-4,6-disulphonic acid | " | —NH— | 1-amino-8-hydroxy-naphthalene-4,6-disulphonic acid | blue |
| 2-amino-8-hydroxy-naphthalene-6-sulphonic acid | " | —NH— | 2-amino-8-hydroxy-naphthalene-6-sulphonic acid | reddish-tinged blue |
| 2-amino-8-hydroxy-naphthalene-3,6-disulphonic acid | " | —NH— | 2-amino-8-hydroxy-naphthalene-3,6-disulphonic acid | reddish-tinged blue |
| 1,3-diaminobenzene-4-sulphonic acid | 1-aminonaphthalene | —NH— | 1,3-diaminobenzene-4-sulphonic acid | brown |
| 1,3-diaminobenzene 4,6-disulphonic acid | " | —NH— | 1,3-diaminobenzene-4,6-disulphonic acid | " |
| 2,4-diaminotoluene-5-sulphonic acid | " | —NH— | 2,4-diaminotoluene-5-sulphonic acid | " |
| 1-amino-3-sulphomethyl-aminobenzene | " | —NH— | 1-amino-3-sulphomethyl-aminobenzene | " |
| 1-sulphomethylamino-3-aminobenzene-4-sulphonic acid | " | —NH— | 1-sulphomethylamino-3-aminobenzene-4-sulphonic acid | " |
| 1-carboxymethylamino-3-aminobenzene-4-sulphonic acid | " | —NH— | 1-carboxymethylamino-3-aminobenzene-4-sulphonic acid | " |
| 3-aminophenol-4-sulphonic acid | " | —NH— | 3-aminophenol-4-sulphonic acid | " |
| 1-amino-8-hydroxy-naphthalene-3,6-disulphonic acid | " | —NH— | 1-amino-8-hydroxy-naphthalene-3,6-disulphonic acid | blue |
| 1-amino-8-hydroxy-naphthalene-2,4-disulphonic acid | " | —NH— | 1-amino-8-hydroxy-naphthalene-2,4-disulphonic acid | " |
| 1-amino-8-hydroxy-naphthalene-4,6-disulfonic acid | " | —NH— | 1-amino-8-hydroxy-naphthalene-4,6-disulfonic acid | " |
| 1-amino-8-hydroxy-naphthalene-3,6-disulphonic acid | " | —NH— | 2-amino-8-hydroxy-naphtahlene-6-sulphonic acid | reddish-tinged blue |
| 1,3-diaminobenzene-4-sulphonic acid | 1-amino-2-ethoxy-naphthalene-6-sulphonic acid | —NH— | 1,3-diaminobenzene-4-sulphonic acid | brown |
| 1-amino-8-hydroxy-naphthalene-3,6-disulphonic acid | 3-amino-8-hydroxy-naphthalene-6-sulphonic acid | —NH— | 1-amino-8-hydroxy-naphthalene-3,6-disulphonic acid | blue |
| 3-aminophenol | 2-amino-8-hydroxy-naphthalene-3,6-disulphonic acid | —NH— | 3-aminophenol | brown |
| 1,3-diaminobenzene | " | —NH— | 1,3-diaminobenzene | " |
| 2,4-diaminotoluene | " | —NH— | 2,4-diaminotoluene | " |
| 1-amino-3-carboxy-methylaminobenzene | " | —NH— | 1-amino-3-carboxymethyl-aminobenzene | " |
| 1-amino-3-hydroxyethyl-aminobenzene | " | —NH— | 1-amino-3-hydroxyethyl-aminobenzene | " |
| 1-amino-3-oxalylamino-benzene | " | —NH— | 1-amino-3-oxalylamino-benzene | " |
| 1-amino-8-hydroxy-naphthalene-4-sulphonic acid | " | —NH— | 1-amino-8-hydroxy-naphthalene-4-sulphonic acid | blue |
| 2-amino-8-hydroxy-naphthalene-6-sulphonic acid | " | —NH— | 2-amino-8-hydroxy-naphthalene-6-sulphonic acid | reddish-tinged blue |
| 3-aminophenol | 1-amino-8-hydroxy-naphthalene-3,6-disulphonic acid | —NH— | 3-aminophenol | brown |
| 3-aminophenol | " | —NH— | 1,3-diaminobenzene | " |
| 3-aminophenol | " | —NH— | 2,4-diaminotoluene | " |
| 1,3-diaminobenzene | " | —NH— | 1,3-diaminobenzene | " |

-continued

| Coupling component $B_1-H$ | Diazotisable coupling component $M-NH_2$ | 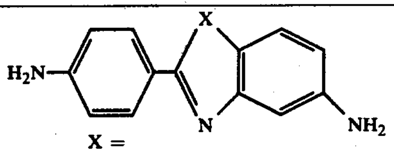 X = | Coupling component $B_2-H$ | Colour shade on cotton |
|---|---|---|---|---|
| 1,3-diaminobenzene-4-sulphonic acid | " | —NH— | 1,3-diaminobenzene | " |
| 1-amino-3-carboxymethylaminobenzene | " | —NH— | 1,3-diaminobenzene | " |
| 1-amino-3-hydroxyethylaminobenzene | " | —NH— | 1-amino-3-hydroxyethylaminobenzene | " |
| 1-amino-3-oxalylaminobenzene | " | —NH— | 1,3-diaminobenzene | " |
| 1,3-diaminobenzene-4-sulphonic acid | 2-amino-8-hydroxynaphthalene-6-sulphonic acid | —NH— | 1,3-diaminobenzene | " |
| 1-amino-3-carboxymethylaminobenzene | " | —NH— | " | " |
| 1-amino-3-sulphomethylaminobenzene | " | —NH— | " | " |
| 2-amino-4-carboxymethylaminotoluene | " | —NH— | 2,4-diaminotoluene | " |
| 2-amino-4-sulphomethylaminotoluene | " | —NH— | 1,3-diaminobenzene | " |
| 3-aminophenol-6-sulphonic acid | " | —NH— | 1,3-diaminobenzene | " |
| 1,3-diaminobenzene | " | —NH— | 1,3-diaminobenzene-4-sulphonic acid | " |
| 1,3-diaminobenzene | " | —NH— | 1-aminonaphthalene-6-sulphonic acid | " |
| " | " | —NH— | 1-aminonaphthalene-7-sulphonic acid | " |
| 1,3-diamino-4-methylbenzene | " | —NH— | 1-aminonaphthalene-6-sulphonic acid | " |
| 1-amino-3-carboxymethylaminobenzene | " | —NH— | " | " |
| 1-amino-3-hydroxyethylaminobenzene | " | —NH— | " | " |
| 3-aminophenol | " | —NH— | " | " |
| 2,4-diaminotoluene | " | —NH— | 2-amino-8-hydroxynaphthalene-6-sulphonic acid | black |
| 3-aminophenol | " | —NH— | " | " |
| 1,3-diaminobenzene-4-sulphonic acid | " | —NH— | " | " |
| 1-amino-3-carboxymethylaminobenzene | " | —NH— | " | " |
| 1-amino-3-sulphomethylaminobenzene | " | —NH— | " | " |
| 1-amino-3-hydroxyethylaminobenzene | " | —NH— | " | " |
| 2-amino-4-carboxymethylaminotoluene | " | —NH— | " | " |
| 1,3-diaminobenzene | " | —NH— | 1-amino-8-hydroxynaphthalene-3,6-disulphonic acid | blue |
| 2,4-diaminotoluene | " | —NH— | " | " |
| 3-aminophenol | " | —NH— | " | " |
| 1-amino-3-carboxymethylaminobenzene | " | —NH— | " | " |
| 1-amino-3-hydroxyethylaminobenzene | " | —NH— | " | " |
| 2-amino-4-carboxymethylaminotoluene | " | —NH— | " | " |
| 2-amino-4-hydroxyethylaminotoluene | " | —NH— | " | " |
| 1-aminonaphthalene-6(7)-sulphonic acid | " | —NH— | 1-amino-3-hydroxyethylaminobenzene | brown |
| " | " | —NH— | 1,3-diaminobenzene | " |
| " | " | —NH— | 2,4-diaminotoluene | " |
| " | " | —NH— | 2-amino-4-hydroxyethylaminotoluene | " |
| " | " | —NH— | 1-amino-3-carboxymethylaminobenzene | " |
| " | " | —NH— | 2-amino-4-carboxymethylaminotoluene | " |
| " | " | —NH— | 2-amino-8-hydroxynaphthalene-6-sulphonic acid | violet-black |
| " | " | —NH— | 1-amino-8-hydroxynaphthalene-3,6-disulphonic acid | black-blue |
| 2-amino-8-hydroxynaphthalene-6-sulphonic acid | " | —NH— | 1,3-diaminobenzene | black |
| " | " | —NH— | 2,4-diaminotoluene | " |
| " | " | —NH— | 1-amino-3-carboxymethylaminobenzene | " |
| " | " | —NH— | 2-amino-4-carboxymethylaminotoluene | " |

-continued

| Coupling component $B_1$—H | Diazotisable coupling component M—$NH_2$ | 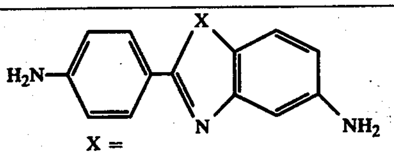 X = | Coupling component $B_2$—H | Colour shade on cotton |
|---|---|---|---|---|
| " | " | —NH— | 1-amino-3-hydroxyethylaminobenzene | " |
| " | " | —NH— | 1,3-diaminobenzene-4-sulphonic acid | " |
| " | " | —NH— | 1-aminonaphthalene | " |
| " | " | —NH— | 1-aminonaphthalene-6(7)-sulphonic acid | violet-black |
| " | " | —NH— | 1-amino-8-hydroxynaphthalene-3,6-disulphonic acid | blue |
| " | " | —NH— | 1-amino-8-hydroxynaphthalene-4-sulphonic acid | " |
| " | " | —NH— | 1-amino-8-hydroxynaphthalene-2,4-disulphonic acid | " |
| " | " | —NH— | 2-amino-5-hydroxynaphthalene-7-sulphonic acid | reddish-tinged blue |
| 1,3-diaminobenzene | 1-aminonaphthalene-6-sulphonic acid | —NH— | 1,3-diaminobenzene-4-sulphonic acid | brown |
| 3-aminophenol | " | —NH— | " | " |
| 2,4-diaminotoluene | " | —NH— | " | " |
| 3-aminophenol-4-sulphonic acid | " | —NH— | " | " |
| 1-amino-3-carboxymethylaminobenzene | " | —NH— | 1,3-diaminobenzene | " |
| 2-amino-4-carboxymethylaminotoluene | " | —NH— | " | " |
| " | " | —NH— | 2,4-diaminotoluene | " |
| " | " | —NH— | 3-aminophenol | " |
| 1-hydroxyethylamino-3-aminobenzene | " | —NH— | " | " |
| " | " | —NH— | 1,3-diaminobenzene | " |
| 1-sulphomethylamino-3-aminobenzene | " | —NH— | " | " |
| 2-amino-4-sulphomethylaminotoluene | " | —NH— | 2,4-diaminotoluene | " |
| 1-amino-3-acetylaminobenzene-6-sulphonic acid | " | —NH— | 1,3-diaminobenzene | " |
| " | " | —NH— | 2,4-diaminotoluene | " |
| " | " | —NH— | 3-aminophenol | " |
| 2,4-diaminotoluene-5-sulphonic acid | " | —NH— | 1,3-diaminobenzene | " |
| 1-aminonaphthalene-6-sulphonic acid | " | —NH— | 1-aminonaphthalene-4-sulphonic acid | " |
| 1-amino-8-hydroxynaphthalene-3,6-disulphonic acid | " | —NH— | 1-amino-8-hydroxynaphthalene-4,6-disulphonic acid | blue |
| " | " | —NH— | 1-amino-8-hydroxynaphthalene-4-sulphonic acid | " |
| " | " | —NH— | 1-amino-8-hydroxynaphthalene-2,4-disulphonic acid | " |
| " | " | —N— | 2-amino-8-hydroxynaphthalene-6-sulphonic acid | reddish-tinged blue |
| " | " | —NH— | 3-amino-8-hydroxynaphthalene-6-sulphonic acid | blue-violet |
| 1-aminonaphthalene-6-sulphonic acid | 1-aminonaphthalene-6-sulphonic acid | —NH— | 1,3-diaminobenzene | brown |
| " | " | —NH— | 1,3-diaminobenzene-4-sulphonic acid | " |
| " | " | —NH— | 1-carboxymethylamino-3-aminobenzene | " |
| " | " | —NH— | 2-amino-3-carboxymethylaminotoluene | " |
| " | " | —NH— | 3-aminophenol | " |
| " | " | —NH— | 2,4-diaminotoluene | " |
| " | " | —NH— | 1-hydroxyethylamino-3-aminobenzene | " |
| " | " | —NH— | 1-sulphomethylamino-3-aminobenzene | " |
| 1-amino-8-hydroxynaphthalene-3,6-disulphonic acid | 1-aminonaphthalene | $CH_3$<br>\|<br>—N— | 1-amino-8-hydroxynaphthalene-3,6-disulphonic acid | blue |
| " | " | $C_2H_5$<br>\|<br>—N— | | blue |
| " | " | —$N(C_6H_5)$— | " | " |
| " | " | —$N(CH_2$—$C_6H_5)$— | " | " |
| " | " | NH, 6-$CH_3$ | " | " |
| " | " | NH, 4-Cl | " | " |

-continued

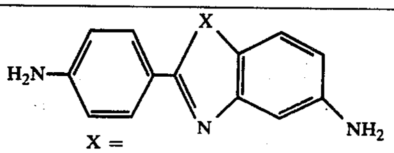

| Coupling component $B_1$—H | Diazotisable coupling component M—$NH_2$ | X = | Coupling component $B_2$—H | Colour shade on cotton |
|---|---|---|---|---|
| " | " | NH, 3'-Cl | " | " |
| " | " | NH, 2'-Cl | " | " |
| " | " | NH, 7Cl, 3'-Cl | " | " |
| " | " | —O— | " | " |
| " | " | —S— | " | " |
| " | " | —S—, 6-$CH_3$ | " | " |

Table II

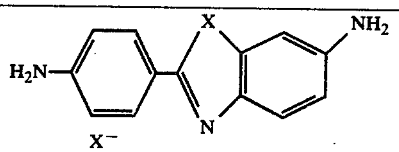

| Coupling component $B_1$—H | Diazotisable coupling component M—$NH_2$ | $X^-$ | Coupling component $B_2$—H | Colour shade on cotton |
|---|---|---|---|---|
| 1-Amino-8-hydroxy-naphthalene-3,6-disulphonic acid | 1-aminonaphthalene | O | 1-amino-8-hydroxy-naphthalene-3,6-disulphonic acid | blue |
| " | " | S | " | " |
| 1,3-diaminobenzene-4-sulphonic acid | 1-aminonaphthalene-6-sulphonic acid | O | 1,3-diaminobenzene-4-sulphonic acid | brown |
| " | " | S | " | " |
| 1-amino-8-hydroxy-naphthalene-3,6-disulphonic acid | 2-amino-8-hydroxy-naphthalene-6-sulphonic acid | O | 1-amino-8-hydroxy-naphthalene-3,6-disulphonic acid | blue |
| " | " | S | " | blue |

We claim:

1. A water-soluble trisazo dyestuff of the formula $$B_1—N{=}N—Z—N{=}N—M—N{=}N—B_2$$

wherein Z is

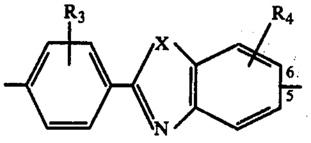

or

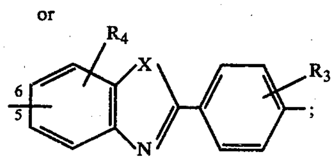

;

M has the formula

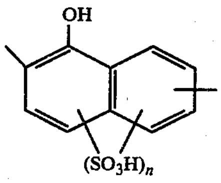

or

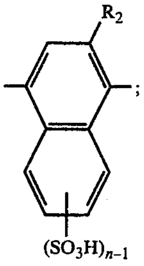

;

wherein n is the number 1 or 2, $B_1$ and $B_2$ are the same or different and are selected from the group consisting of

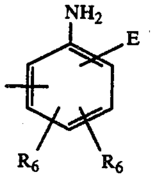

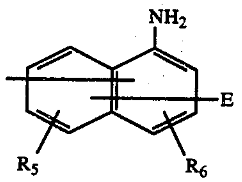

X is

,

—O— or —S—, $R_1$ is hydrogen, alkyl having 1 to 4 carbon atoms, phenyl or benzyl;

$R_2$ is hydrogen, alkyl or alkoxy having 1 to 4 carbon atoms;

$R_3$ and $R_4$ are hydrogen, chloro, bromo, alkyl and alkoxy having 1 to 2 carbon atoms;

E is a hydrogen atom, hydroxyl, amino, alkylamino having 1 to 4 carbon atoms, phenylamino, naphthylamino, benzoylamino, naphthoylamino, alkanoylamino having 2 to 5 carbon atoms, carboxyalkylamino having 2 to 3 carbon atoms, sulphoalkylamino having 1 to 2 carbon atoms, hydroxyalkylamino having 1 to 2 carbon atoms, dialkylamino having 1 to 4 carbon atoms in each alkyl, phenylalkylamino, naphthyl-alkylamino having 1 to 4 carbon atoms in the alkyl chains and alkanoylalkylamino having 1–4 carbon atoms in the alkyl and 2 to 5 carbon atoms in the alkanoyl group;

$R_5$ and $R_6$ are the same or different and are selected from the group consisting of hydrogen, alkyl having 1-4 carbon atoms, alkoxy having 1–4 carbon atoms, nitro, sulpho, chloro, bromo, alkoxy-carbonyl having 2–5 carbon atoms and carboxyl with the proviso that at least one of M, $B_1$ and $B_2$ includes a sulpho substituent.

2. A water soluble trisazo dyestuff of claim 1 wherein M is

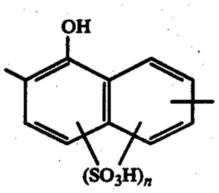

3. A water soluble trisazo dyestuff of claim 1 wherein M is

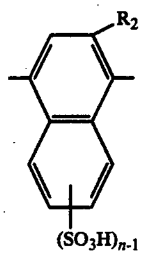

4. A water soluble trisazo dyestuff of claim 1 wherein $B_1$ and $B_2$ are aminophenyl or substituted amino phenyl of the formula

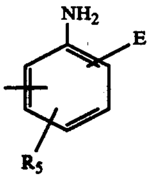

wherein

E is a hydrogen atom, hydroxyl, amino, alkylamino having 1 to 4 carbon atoms, phenylamino, naphthylamino, benzylamino, naphthoylamino, alkanoylamino having 2 to 5 carbon atoms, carboxyalkylamino having 2 to 3 carbon atoms, sulphoalkylamino having 1 to 2 carbon atoms, hydroxyalkylamino having 1 to 2 carbon atoms, or dialkylamino having 1 to 4 carbon atoms in each alkyl, $R_5$ is selected from the group consisting of hydrogen, alkyl having 1–2 carbon atoms, alkoxy having 1–2 carbon atoms, nitro, sulpho, chloro and carboxyl.

5. A water soluble trisazo dyestuff of claim 1 wherein $B_1$ and $B_2$ are aminonaphthyl substituted aminonaphthyl of the formula

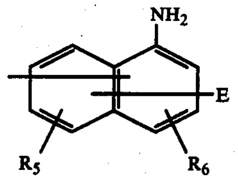

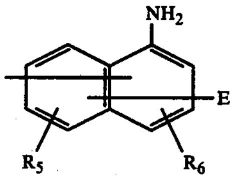

wherein

E is a hydrogen atom, or hydroxyl one of $R_5$ and $R_6$ is hydrogen or sulfo and the other is selected from the group consisting of hydrogen, sulpho, chloro and carboxyl.

6. A water soluble trisazo dyestuff of claim 1 wherein $B_1$ and $B_2$ are aminonaphthyl or substituted aminonaphthyl substituted by two sulpho groups.

7. A water soluble trisazo dyestuff of claim 1 wherein $R_3$ and $R_4$ are hydrogen, methyl or chloro.

8. A water soluble trisazo dyestuff of claim 1 wherein $R_3$ and $R_4$ are each hydrogen.

9. A water soluble trisazo dyestuff of claim 1 having from 2–4 sulpho substituents.

* * * * *

UNITED STATES PATENT AND TRADEMARK OFFICE

CERTIFICATE OF CORRECTION

PATENT NO. : 4,144,230

DATED : March 13, 1979

INVENTOR(S) : Wolfgang Bauer et al

It is certified that error appears in the above-identified patent and that said Letters Patent are hereby corrected as shown below:

| Column | line | Correction |
| --- | --- | --- |
| 2 | 4 of front page | Change " 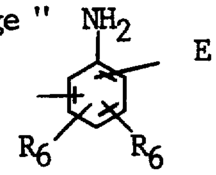 " to -- 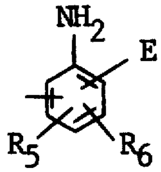 -- |
| 1 | 45 | Change " 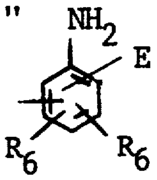 " to -- 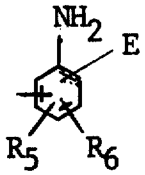 -- |

UNITED STATES PATENT AND TRADEMARK OFFICE

CERTIFICATE OF CORRECTION

PATENT NO. : 4,144,230

DATED : March 13, 1979

INVENTOR(S) : Wolfgang Bauer et al

It is certified that error appears in the above-identified patent and that said Letters Patent are hereby corrected as shown below:

| Column | Line | Correction |
|---|---|---|
| 26 | 15 | Please cancel formula |
| 7 | 6 | Change "X--BH—," to --X= -NH-,-- |
| 6 | 20 | Change "$B_1$-N=N-Z-N=N-M-N=N-$B_1$" to --$B_2$-N=N-Z-N=N-M-N=N-$B_1$--. |
| 24 | 47 | Change "—5—" to -- -S- --. |
| 11 | 64 | Change "fllowing" to --following--. |
| 3 | 30 | Change Va formula to |

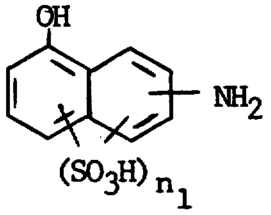

Va

UNITED STATES PATENT AND TRADEMARK OFFICE

CERTIFICATE OF CORRECTION

PATENT NO. : 4,144,230

DATED : March 13, 1979

INVENTOR(S) : Wolfgang Bauer et al

It is certified that error appears in the above-identified patent and that said Letters Patent are hereby corrected as shown below:

| Column | Line | Correction |
|---|---|---|
| 26 | 9 | Insert --or-- before "substituted". |

Signed and Sealed this

*Fifteenth* Day of *July 1980*

[SEAL]

*Attest:*

SIDNEY A. DIAMOND

*Attesting Officer*

*Commissioner of Patents and Trademarks*